Dec. 8, 1959  G. F. BENN  2,916,591
ELECTRICAL SWITCH AND PEDESTAL HOUSING STRUCTURE
Filed Nov. 19, 1956  2 Sheets-Sheet 1

INVENTOR.
GEORGE F. BENN
BY
ATTORNEY

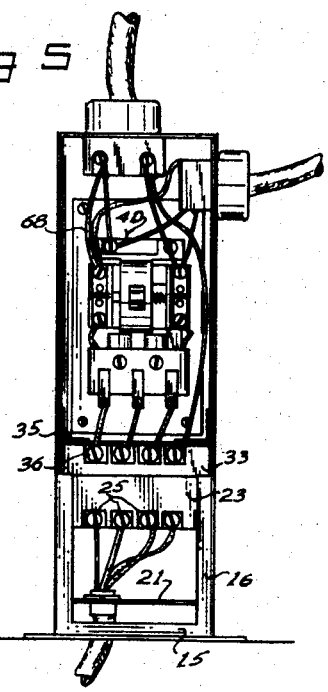
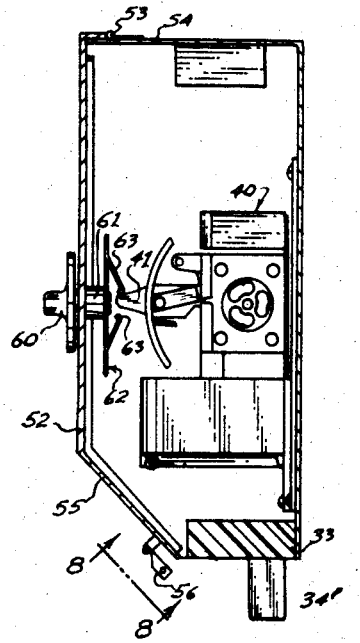
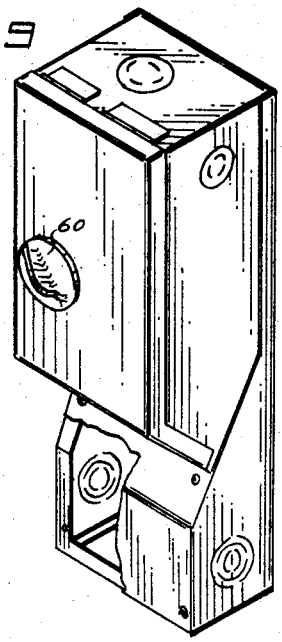
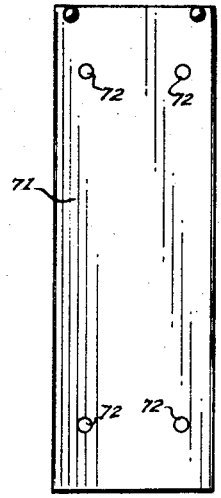
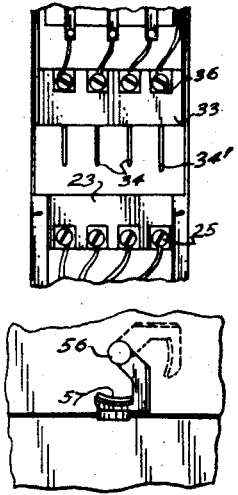
INVENTOR.
GEORGE F. BENN
BY
ATTORNEY

United States Patent Office 2,916,591
Patented Dec. 8, 1959

2,916,591

ELECTRICAL SWITCH AND PEDESTAL HOUSING STRUCTURE

George F. Benn, Greensboro, N.C., assignor to B. & C. Metal Stamping Company, Atlanta, Ga., a corporation of Georgia Application November 19, 1956, Serial No. 623,086

11 Claims. (Cl. 200—168)

This invention relates to an electrical switch and pedestal housing structure therefor, and is particularly concerned with pedestal type quick detachable and readily disengageable switch structures as may be used in the control of electrical equipment such as looms and the like.

In the energization of electrical equipment and in particular the energization of multiple electrical units such as looms, and other textile machinery and like equipment, difficulties frequently arise with respect to the individual servicing of equipment without interference with the supply of electrical power to associated equipment. In many installations, the multiple units are energized through electrical cables which may be installed permanently in concrete flooring or through electrical wiring mounted in permanent structural units such as beams and columns. The individual units are frequently energized through magnetic switches, and in the wiring of the individual machines from permanent supply cables difficulty arises when it becomes necessary to service an individual machine due to the fact that it may be necessary to de-energize the entire supply system for several machines because of the absence of individual circuit controllers mounted in advance of the magnetic starter of the machines. Simple or conventional switches which might be installed between the multiple machine power source and the individual machines require a permanent installation and difficulties in wiring. Also, conventional switches are subject to wear or breakdown or need of repair as well as the machines themselves and their magnetic starters.

It is therefore among the objects of the present invention to provide a novel, simple and improved individual machine control switch designed for use in connection with multiple machine electrical energization sources.

A further object of the present invention is to provide a switch of the character defined which may be readily plugged into pre-existing outlets for supplying individual machines from a multiple source.

Another object of the present invention is to provide a switch in which the connections therefrom to the individual machine may be quickly and conveniently detached without the use of special tools or the individual disconnection of circuit wires.

It is also an object of the present invention to provide a compact unit or type of self-contained electrical circuit controller for use as an individual circuit control for multiple machines energized from a single circuit installation.

Numerous other objects, features and advantages of the present invention including structural details by which the switch is rendered effective, efficient and economical in construction as well as rugged and durable will be apparent from consideration of the following specification taken in conjunction with the accompanying drawings, in which:

Fig. 5 is a front view of the assembled device with the covers removed.

Fig. 6 is a side elevation of the upper portion of the structure with the side of the housing removed.

Fig. 7 is a view showing the manner of assembling the top and bottom portions of the unit.

Fig. 8 is a detailed view taken on the line 8—8 of Fig. 6 showing the means of securing the pivoted cover closed.

Fig. 9 is a perspective view of a modified form of the invention.

Fig. 10 is a rear plan view of that form of the invention indicated in Fig. 9.

Figure 1:
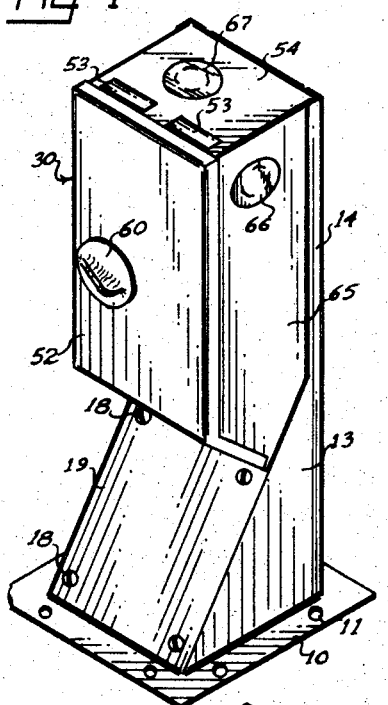
Fig. 1 is a perspective front view of one embodiment of the present invention.
Figure 3:
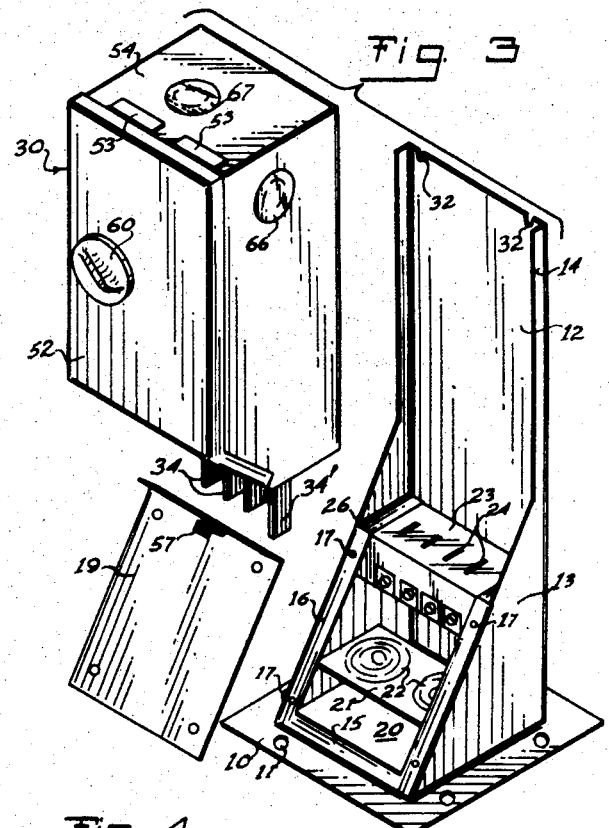
Fig. 3 is an exploded view of the device in Figs. 1 and 2.

While the various features of the present inventive concept may well be carried out in a wide variety of structural details and design arrangements, that form of the invention here shown by way of illustration may be generally defined as consisting of a pedestal type housing in the lower portion of which is a generally conventional electrical receptacle for the detachable reception of the prongs of an equally conventional matching plug member. The housing is provided with suitable securing structure such as a base or the back thereof which is arranged for permanent attachment to or adjacent an outlet box for the individual supply of current from a multiple energizing circuit as may be provided in the floor, wall, column or like structure of an industrial building. The present structure includes a top or superstructure mounting the matching plug member and enclosing a conventional switch mechanism by which energization provided through the union of the receptacle and plug members may be supplied to individual machinery units. One important feature of the present invention is the provision of a pivoted closure for the superstructure including a rotatably mounted and externally operable key or knob for actuating the otherwise manually controlled switch button of the internal switch mechanism. A further feature of the invention is the provision of externally open plug-in inlet and outlet fixtures by which conducting cables for the machine may be conveniently engaged and disengaged from the switch mechanism so that the switch structure itself and/or the starter box of the machine may be repaired or replaced without requiring the usual engagement and disengagement of individual conductor wires. The present invention also provides a novel and improved grounding mechanism whereby the removable switch mechanism may be applied and detached from the permanently installed receptacle with insurance of a grounding of the circuit as the first step in the application of the matching plug member and as the last step in the withdrawal thereof.

Referring now to the structure of that form of the invention presented in Figs. 1-8 of the drawings, it will be seen that the pedestal of the structure includes a generally rectangular flange-like base annulus 10 suitably provided with apertures as indicated at 11 by which the pedestal may be secured on a supporting surface such as the floor of a building in which the cables for the energization of a plurality of machines or instrumentalities are laid.

It is here contemplated that the base 10 may be fitted against a conventional outlet box to the peripheral edge of which the base 10 is secured. While the invention is in no way concerned with the material or manner of forming the pedestal structure, it is suggested that the entire pedestal be formed from suitable heavy gauge steel and appropriately welded to provide a rugged and durable casing sufficiently rigid to withstand the abuses to which it may be subjected in factory installations but appropriately light for such transportation as may be required.

From the base 10 there extends upwardly for the entire height of the pedestal a guide or back plate 12. Triangular side members 13 also extend upwardly from the sides of the base to a point approximately midway of the height at which point they are engaged with the side flanges 14 extending upwardly therefrom to the full height of the back 12. At the front of the housing structure there is provided a narrow transverse front wall 15 and upwardly extending front flanges 16 lying parallel with the lower portion of the front edge of the triangular side members 13. These inwardly extending flanges 16 are preferably formed with threaded apertures 17 for the reception of cover securing screws 18 which releasably engage a cover 19 which is adapted to be thus secured to flanges 16 to provide an inwardly and upwardly inclined removable cover for the lower truncated triangular chamber or base housing 20.

Within the chamber 20 thus formed by the lower portion of the back, sides and the front cover, there is mounted a transversely extending plate 21 formed with a pair of knockout members 22, the arrangement being such that with the pedestal secured in appropriate position over an outlet box the knockout members may provide cable apertures for the reception of electrical cables from the outlet box. Above the plate 21 there is mounted within the chamber 20 a conventional receptacle 23, here shown as including four blade receiving sockets 24 which are electrically wired to connectors 25, the arrangement being such that a cable extending upwardly into the pedestal and through the apertures of the knockout members may be engaged with the connectors 25 so as to provide for the establishment of an electrical circuit through the members 24 when the device is fully assembled and in operative position. The receptacle 23 may be appropriately secured in the upper portion of the lower chamber 20 by bolts extending upwardly at the edges thereof to engage inwardly turned intermediate flanges 26 extending inwardly from a mid position of the side of the triangular side pieces 13 as shown. The upper portion of the assembly includes a separate and removably mounted switch casing or housing 30 of a generally rectangular configuration and so transversely dimensioned as to snugly fit within the upper side flanges 14. The upper edge of the rear of the switch casing 30 is provided with headed studs 31 which are adapted to slideably fit in edge recesses 32 at the top of the back 12, thus to preclude an accidental forward displacement of the casing 30 but permitting a free upward movement thereof for detaching the casing from the lower portion of pedestal. Within the casing 30 at the bottom thereof there is transversely mounted a matching or male plug element 33 having downwardly extending contact blades 34 which, when the casing 30 is in fitted position, are received by the companion sockets 24 in the matching lower receptacle element 23. The upper receptacle element 33 may be secured transversely of the casing 30 against the rear wall thereof by the engagement of threaded securing bolts to inwardly extending flanges 35 formed to extend inwardly from the side walls of the housing as indicated.

The plug member 33 has its blades 34 suitably connected in the conventional manner with connectors 36 by which the upper receptacle may be suitably wired to the switch hereinafter referred to. One feature of the present invention is the fact that the blade 34' of the plug 33 is of greater length than the companion blades 34, and this blade is adapted to be grounded. Thus, when the casing 30 is thrust downwardly to engage the blades 34 of the plug 33 in the sockets 24 of the lower receptacle, the blade 34' will first enter its socket establishing a ground prior to the engagement of the other blades and hence a full grounding of the circuit is insured before contact by the live blades. Similarly, the blade 34' will stay in electrical engagement with its socket after the shorter blades 34 have been moved out from electrical contact, and hence the grounding is insured throughout both insertion and removal of the casing 30.

Within the casing 30 and above the plug 33 there is mounted against the rear wall thereof a conventional switch 40 here shown as a three pole switch preferably of the snap acting variety and including a forwardly extending pivotally movable actuating arm 41 by which the switch may be directly and manually operated when the cover of the casing 30 is open. The front cover 52 is hinged at 53 to the top 54 of the casing 30 and includes a front panel adapted when the cover is closed to lie vertically parallel in front of the back 12 of the pedestal. At the lower end, the cover turns inwardly as at 55 to approach when closed the front lower edge of the plug 33. For securing the cover in closed position, a pivoted catch 56 is provided which may engage beneath a keeper 57 extending outwardly from the front edge of the lower cover 19. As to both the covers 19 and 52 it will be understood that they may be provided with suitable felt or like peripheral cushioning and sealing elements which insure a sealing of the entire unit so as to preclude danger from accidental flashes and for the exclusion of moisture or foreign matter in the air.

Figure 4:
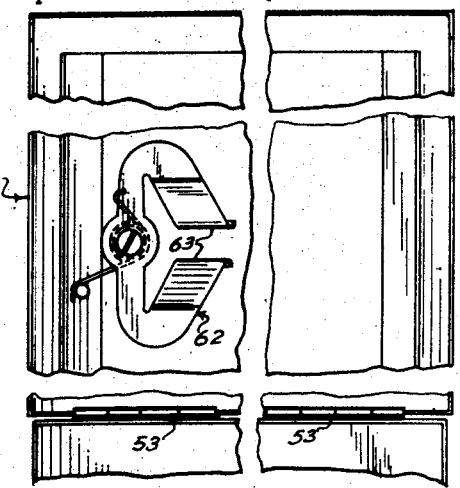
Fig. 4 is a view of the inside of the pivoted front cover of the device.

For actuating the arm 41 of the switch 40 when the cover is closed, there is provided an external rotary switch knob 60 mounted upon a rod 61 extending through the front cover and provided within the cover with a yoke 62 best shown in Fig. 4 of the drawing. The yoke 62 has a pair of confronting and spaced switch operating arms 63. When the cover is closed, as indicated in Fig. 6, operating arm 41 of the switch engages between the confronting ends 63 whereby upon rotation of the knob 60 in clockwise direction the arm 41 will be rocked downwardly to the "on" position of the switch while a reverse or counter-clockwise rotation of the knob 60 will lift the arm 41 to the opposite or "off" position of the switch.

The side 65 of the casing 30 and top 54 thereof are each provided with electrically engageable connector sockets 66 and 67, respectively, one of which, here shown as the connector 66, is provided with three prong receiving slots and these may be used for a three phase circuit supply. The other connector socket is shown as including four prong receiving recesses and is adaptable to provide an equipment ground for use with the three phase circuit. As indicated in the drawings, the receptacles, the switch and the connector sockets are suitably wired by the use of wire 68 in appropriate manner. Since the invention is not concerned with the specific receptacles, switch or sockets or the manner of their wiring, it is not deemed appropriate to encumber the application with a specific discussion of the type of wiring which may be employed by those skilled in the art.

Figure 2:
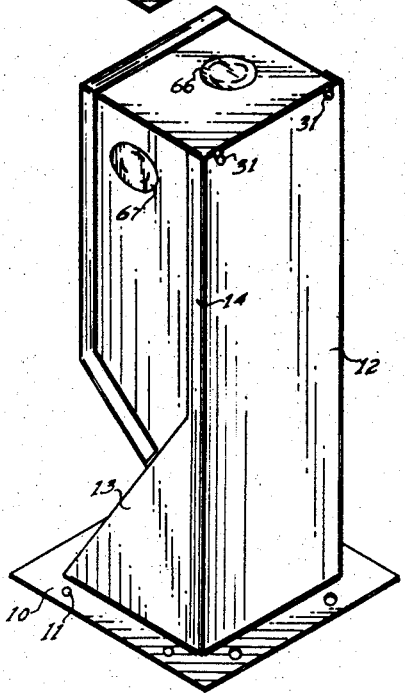
Fig. 2 is a rear perspective view of the invention depicted in Fig. 1.

Referring now to Figs. 8 and 9 of the drawings it will be seen that the invention is not limited to the floor supported pedestal of Figs. 1, 2 and 8 of the drawings but the invention may be carried out in a similar manner by the structure as shown in Figs. 9 and 10 wherein the base 10 is not used. However, the back 71 is provided with apertures 72 through which securing bolts may extend to mount the structure on a vertical column or such other vertical support as may be appropriate.

From the foregoing it is seen that the present invention provides a compact, effective and efficient switch arrangement by which power may be individually directed to individual units and by which the switch structure itself may be bodily removed from the combination when repair or replacements are required. It will also be seen that the arrangement provides a complete housing for the electrical equipment and encloses the switch for operation externally through the knob 60 so as to enhance the safety factor of the device. It should further be noted that the provision of the sockets permit the ready insertion and withdrawal of the cables from the switch to the machine so as to permit ease in establishing the electrical connections. As indicated before, the extension of one of the prongs of the upper receptacle insures grounding as the switch is applied and removed from the structure. It will, of course, be understood that in the practice of the invention numerous changes, modifications and the full use of equivalents may be resorted to without departure from the spirit or scope of the invention as defined in the following claims.

I claim:

1. A switch assembly including a pedestal base adapted to be mounted upon an electric outlet box, a receptacle member having sockets permanently secured in said pedestal base, a detachable switch housing, a switch in said housing, and a plug permanently secured in said detachable housing including blades receivable in the sockets of said receptacle, said pedestal base having a guide plate extending therefrom, said blades adapted for slidable reception in said sockets in a plane parallel to the plane of said guide plate.

2. A switch assembly including a pedestal base adapted to be mounted upon an electric outlet box, a receptacle member permanently secured in said pedestal base including sockets for the reception of the blades of a companion plug, a detachable switch housing, a switch in said housing, and a companion plug permanently secured in said detachable housing including blades receivable in the sockets of said receptacle, said housing including a pivotally mounted cover enclosing said switch and having a switch actuator extending therethrough, said pedestal base having an extended guide plate, and means for detachably securing said housing to said guide plate.

3. In a device of the character set forth, a base housing, a receptacle within said base housing, a switch housing, a plug in said switch housing adapted for electrical connection with said receptacle, said switch housing having a cover plate, and means for selectively securing said switch housing cover plate to said base housing.

4. In a device of the character set forth, a base housing, a receptacle within said base housing, a switch housing, a plug in said switch housing adapted for electrical connection with said receptacle, said base housing having a cover plate, said switch housing having a cover plate, and means for selectively securing said switch housing cover plate to said base housing cover plate.

5. In a device of the character set forth, a base housing having an inwardly formed top portion, a switch housing having an inwardly formed base portion, said base housing and switch housing adapted for engagement in such manner that said inwardly formed portions define a frontal recess, said base housing having a cover, said switch housing having a cover, and means disposed in said recess for selectively securing said covers.

6. In a device of the character set forth, a base housing having an extended back support, a receptacle within said base housing, a switch housing having a plug adapted for electrical connection with said receptacle, and means for detachably securing said switch housing to said back support.

7. In a device of the character described, a base housing having a guide plate extending therefrom, a receptacle within said base housing, a switch housing, a plug within said switch housing, said plug and receptacle adapted for slidable engagement in a plane parallel to the plane of said guide plate.

8. In a device of the character described as set forth in claim 7 including means for detachably securing said switch housing to said guide plate.

9. A switch assembly including a pedestal base adapted to be mounted upon an electric outlet box, a receptacle mounted in said pedestal base, a switch housing, a plug secured in said switch housing, said pedestal base having an extended back support, said plug and receptacle adapted for slidable engagement in a plane parallel to the plane of said back support.

10. A switch housing as set forth in claim 9 including means for detachably securing said switch housing to said back support.

11. In a device of the character described, a base housing having a guide plate extending therefrom, a receptacle within said base housing, a switch housing, a switch and plug secured within said switch housing, said plug and receptacle adapted for slidable engagement in a plane parallel to said guide plate upon joinder of said housings, said guide plate having side flanges, said switch housing adapted to be received within said flanges so as to guide selective engagement of said switch housing plug with said base housing receptacle, and means for detachably securing said switch housing to said guide plate.

References Cited in the file of this patent

UNITED STATES PATENTS

| | | |
|---|---|---|
| 1,938,309 | Williams | Dec. 5, 1933 |
| 2,213,657 | Rowe | Sept. 3, 1940 |
| 2,633,520 | Chandler et al. | Mar. 31, 1953 |
| 2,805,294 | Edmunds | Sept. 3, 1957 |

FOREIGN PATENTS

| | | |
|---|---|---|
| 623,666 | Great Britain | Mar. 20, 1949 |